United States Patent [19]
Tanaka et al.

[11] Patent Number: 5,852,278
[45] Date of Patent: Dec. 22, 1998

[54] ARC WELDING AND ARC PLASMA CUTTING MACHINES HAVING IMPROVED DC HIGH-VOLTAGE GENERATOR

[75] Inventors: Yoshiaki Tanaka, Takarazuka; Seigo Hagiwara, Kawanishi; Norikazu Osaki, Ikoma-gun; Kazuo Kimoto, Sakai; Naoki Kawai, Ikeda, all of Japan

[73] Assignee: Matsushita Electric Industrial Co., Ltd., Japan

[21] Appl. No.: 773,853

[22] Filed: Dec. 27, 1996

[30] Foreign Application Priority Data

Dec. 28, 1995 [JP] Japan .................................. 7-342820
Sep. 4, 1996 [JP] Japan .................................. 8-234012

[51] Int. Cl.⁶ .................................................. B23K 9/067
[52] U.S. Cl. ........................................................ 219/130.4
[58] Field of Search ............................ 219/130.4, 130.1, 219/130.21, 130.31, 130.32, 130.33, 130.51; 307/4, 75; 361/8, 91

[56] References Cited

U.S. PATENT DOCUMENTS

| | | | |
|---|---|---|---|
| 2,969,494 | 1/1961 | Davis | 219/130.1 |
| 4,459,629 | 7/1984 | Titus | 361/8 |
| 4,618,760 | 10/1986 | Murch et al. | 219/130.4 |
| 4,950,864 | 8/1990 | Campiotti et al. | 219/130.4 |
| 5,582,751 | 12/1996 | Hagiwara et al. | |
| 5,645,741 | 7/1997 | Terayama et al. | 219/130.4 |

FOREIGN PATENT DOCUMENTS

| | | |
|---|---|---|
| 0 585 068 | 3/1994 | European Pat. Off. . |
| 60 63745 | 3/1994 | Japan . |

*Primary Examiner*—Clifford C. Shaw
*Attorney, Agent, or Firm*—Parkhurst & Wendel

[57] ABSTRACT

An arc welding and arc plasma cutting machine having a dc high-voltage generator is provided. The dc high-voltage generator includes a first dc power source, a second dc power source, an one-way rectifier, and a voltage clamping circuit. The first dc power source applies a dc voltage through the one-way rectifier across an electrode and a work piece. The second dc power source is connected across the first dc power source and superimposes a dc voltage on the power produced by the first dc power source for developing an arc discharge across the electrode and the work piece. The voltage clamping circuit connected in parallel to the one-way rectifier to restrict a high-voltage applied to the one-way rectifier below a given level for protecting the one-way rectifier from breakage due to application of the high-voltage.

18 Claims, 13 Drawing Sheets

$I_o = I_1 + I_c$

ARC WELDING AND ARC PLASMA CUTTING MACHINES HAVING IMPROVED DC HIGH-VOLTAGE GENERATOR

BACKGROUND OF THE INVENTION

1. Technical Field

The present invention relates generally to arc welding and arc plasma cutting machines, and more particularly to an improved circuit structure of a dc high-voltage generator for use in arc welding and arc plasma cutting machines.

2. Background of Related Art

FIG. 1 shows a conventional dc high-voltage generator for use in arc welding and arc plasma cutting machines.

The dc high-voltage generator includes generally a first dc power source 1, a second dc power source 2, a one-way rectifier (i.e., a diode) 3, a start switch 6, output terminals 10a and 10b, and a casing 9. The output terminals 10a and 10b are connected to an electrode 4 and a work piece 5 through cable extensions 18 having a distributed capacitance 7.

In operation, turning on of the start switch 6 causes the first and second dc power sources 1 and 2 to be activated. The dc voltage produced by the second dc power source 2 is superimposed on the power produced by the first dc power source and then applied across the electrode 4 and the work piece 5 to develop an arc discharge therebetween.

The second dc power source 2, as show in FIG. 2, includes a voltage generator 200, a control circuit 203, and a dropping resistor 205.

When the start switch 6 is turned on, a dc voltage of about 4.5 kV is developed across the electrode 4 and the work piece 5 so that the distributed capacitance 7 is charged. When a discharging condition is encountered, it will cause the current I0 having a pulse width of about 1μ, showing a peak of about 10 A to be outputted through the output terminals 10a and 10b. An output voltage of the first dc power source 1 then drops to about zero (0) caused by the activity of the dropping resistor 205 so that an arc discharge is stopped. Subsequently, the distributed capacitance 7 is charged again through the dropping resistor 205. When a charged voltage of the distributed capacitance 7 exceeds an arc voltage, it will cause the current I0 to flow out of the distributed capacitance 7 again. This cycle is repeated to produce the current I0 and the output voltage V0 as shown in FIGS. 3(a) and 3(b).

Japanese Patent First Publication No. 2-34277 and U.S. Pat. No. 5,582,751 to Hagiwara et al., issued on Dec. 10, 1996 teach such a dc voltage-superimposing system used in an arc welding machine such as a TIG welding machine, disclosure of which is incorporated herein by reference. This dc voltage-superimposing system however has the following drawbacks.

When the second dc power source 2 provides the dc voltage, the one-way rectifier 3 inhibits it from entering the first dc power source 1. The application of the dc voltage higher than a withstand voltage of the one-way rectifier 3 may however cause the one-way rectifier 3 to be broken. Particularly, when a plurality of one-way rectifiers having a backward withstand voltage lower than an output voltage of the second dc power source are arranged in series, it becomes difficult to distribute a backward voltage uniformly among the one-way rectifiers because of variation in individual characteristic of the one-way rectifiers. In order to avoid this difficulty, the one-way rectifiers of a number sufficient for compensating for the variation in individual characteristics thereof are needed, thus resulting in an increase in total cost of the system.

The breakage of the one-way rectifier 3 may cause the dc voltage to be applied thereto, thereby leading breakage of the first dc power source 1. For these reasons, it is essential to protect the one-way rectifier 3 against application of the dc voltage.

Usually, welding of large-sized structures requires very long cable extensions. The cable extensions shows a great distributed capacitance. FIG. 4 shows the flow of discharge current I0 when an arc discharge is developed in an arc welding or arc plasma welding machine. The discharge current I0 is provided by the sum of current I1 flowing out of the second dc power source 2 and current IC flowing out of the distributed capacitance 7. The greater the distributed capacitance 7 is developed, the greater the current IC, as can be seen from the drawing, flows. Therefore, if a welding operator gets an electric shock, a large quantity of charges stored in the distributed capacitance 7 will flow through the body of the welding operator. The current I1 flowing out of the second dc power source 2 must thus be at a level safe for the human body (e.g., about 10 mA in the IEC 479 standard) without variation.

The current I1 flowing from the second dc power source 2 may be kept below the safe level by connecting a dropping resistor in series with the second dc power source 2. The current I1 however flows through a path extending from the electrode 4 to the work piece 5 and leaks out of the one-way rectifier 3 in the backward direction. When a typical one-way rectifier on the market is used, and a current of several hundreds of amperes flows through it, a current of several milliamperes leaks out of the one-way rectifier in the backward direction with variations in ampere.

As the current leaking out of the one-wary rectifier 3 is increased, an output voltage applied across the electrode 4 and the work piece 5 is, as shown in FIG. 12, attenuated by the dropping resistor 205. This is a common effect to arc welding and arc plasma cutting machines. The attenuation of the output voltage affects, as shown in FIG. 5, the percentage of success in developing an arc discharge. It is thus essential to decrease the current leading out of the one-way rectifier 3 in the backward direction.

FIG. 6 shows an example of wrong use of a dc high-voltage generator in the case where the welding operator forgot connection of a cable extension between the output terminal 10 and the work piece 5. The shown dc high-voltage generator has substantially the same structure except for a surge protective capacitor 110 which is commonly used in conventional welding and cutting machines for preventing surges from entering the welding or cutting machine through the output terminals 10 from another equipment.

When the dc high-voltage generator is actuated without connection of the output terminal 10 to the work piece 5, it will cause the current IE to flow from the second dc power source 2 to the ground through the surge protective capacitor 110 so that the surge protective capacitor 110 is charged. When the welding operator touches the output terminal 10b for connecting the cable extension thereto, it may cause charges stored in the surge protective capacitor 110 to be discharged so that the welding operator gets an electric shock.

FIG. 7 shows another conventional dc high-voltage generator having substantially the same circuit structure as the one shown in FIG. 1 except for a parallel output impedance 71. The arc welding and arc plasma cutting machines may use cooling water for cooling the electrode 4. Such cooling water shows a water resistance equivalent to the output impedance 71 disposed between the output terminals 10a and 10b. This is due to structures of a circulation path of the cooling water, the cable extensions 18, and the electrode 4.

The second dc power source 2 is, as described above, given the dropping characteristics (i.e., the resistor 205) for safety against electric shocks. For example, if the dropping characteristics show a voltage drop as indicated by "A" in FIG. 8, an operating point will appear at AL due to the activity of the output impedance 71 having 1 MΩ so that an output voltage of the second dc power source 2 is decreased to about zero, thereby resulting in failure in developing arc discharges.

If the dropping characteristics of the second dc power source 2 show a voltage drop as indicated by "B" in FIG. 8, the operating point will appear at BL due to the activity of the output impedance 71 of 1 MΩ so that the voltage drop from 4.5 kV is decreased by half. This level allows the arc discharge to be developed smoothly, but may cause the electric shocks if the welding operator touches the electrode 4.

Specifically, in the case of the dropping characteristic A, a discharge current does not exceed, as shown in FIG. 9, a safety limit within an arc discharge allowable range, but a voltage drop is produced by the output impedance 71, resulting in failure in developing arc discharges. In the case of the dropping characteristic B, the performance of developing arc discharges is ensured even if a small output impedance exists, but the discharge current exceeds the safety limit.

SUMMARY OF THE INVENTION

It is therefore a principal object of the present invention to avoid the disadvantages of the prior art.

According to one aspect of the present invention, there is provided an arc welding or arc plasma cutting machine which comprises: (a) a pair of electrodes; (b) a first dc power source applying dc voltage across first and second output terminals connected to the electrodes; (c) a one-way rectifying circuit disposed between the first dc power source and the first output terminal; (d) a second dc power source connected across the first and second output terminals, the second dc power source superimposing dc voltage on power produced by the first dc power source for developing an arc discharge across the electrodes; and (e) a voltage clamping circuit connected in parallel to the one-way rectifier.

In the preferred mode of the invention, a first casing and a second casing are provided. The first casing has disposed therein the first dc power source. The second casing has disposed therein the one-way rectifying circuit, the second dc power source, and the voltage clamping circuit which are connected to the first dc power source through cable extensions.

A casing may alternatively be provided which has disposed therein the first dc power source, the one-way rectifying circuit, the second dc power source, and the voltage clamping circuit. A charge protective circuit is further provided which is connected between the second output terminal and the casing.

The voltage clamping circuit is designed to restrict a maximum level of current leaking out of the one-way rectifying circuit in a backward direction when a backward bias voltage is applied across the one-way rectifying circuit below 1 mA.

The one-way rectifying circuit includes a plurality of one-way rectifiers connected in series, the voltage clamping circuit including a plurality of voltage clamping elements connected in parallel to the one-way rectifiers, respectively.

The charge protective circuit includes one of a resistor, an inductor, and a voltage clamping element.

The second dc power source includes a voltage generator, a capacitive circuit, a discharge detector, and a control circuit. The capacitive circuit is charged and discharged according to a voltage level appearing across the first and second output terminals. The discharge detector detects discharge of the capacitive circuit to provide a signal indicative thereof. The control circuit is responsive to the signal from the discharge detector to deactivate the voltage generator for a preselected period of time.

The control circuit of the second dc power source may include a timer circuit which activates both or either of the first dc power source and the voltage generator of the second dc power source in response to input of a starting signal from a starting switch and which deactivates both or either of the first dc power source and the voltage generator of the second dc power source after a given period of time expires following the input of the starting signal to the control circuit if the first dc power source fails to develop an arc discharge across the electrodes in the given period of time.

The second dc power source may include a voltage generator, a first circuit, and a second circuit. The first circuit includes a capacitive circuit, a discharge detector, and a control circuit. The second circuit includes a capacitive circuit, a discharge detector, and a control circuit. Each of the capacitive circuits of the first and second circuits is charged and discharged according to a voltage level appearing across the first and second output terminals. Each of the discharge detector detects discharge of corresponding one of the capacitive circuit to provide a signal indicative thereof. Each of the control circuit is responsive to the signal from corresponding one of the discharge detector to deactivate the voltage generator for a preselected period of time.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 10:
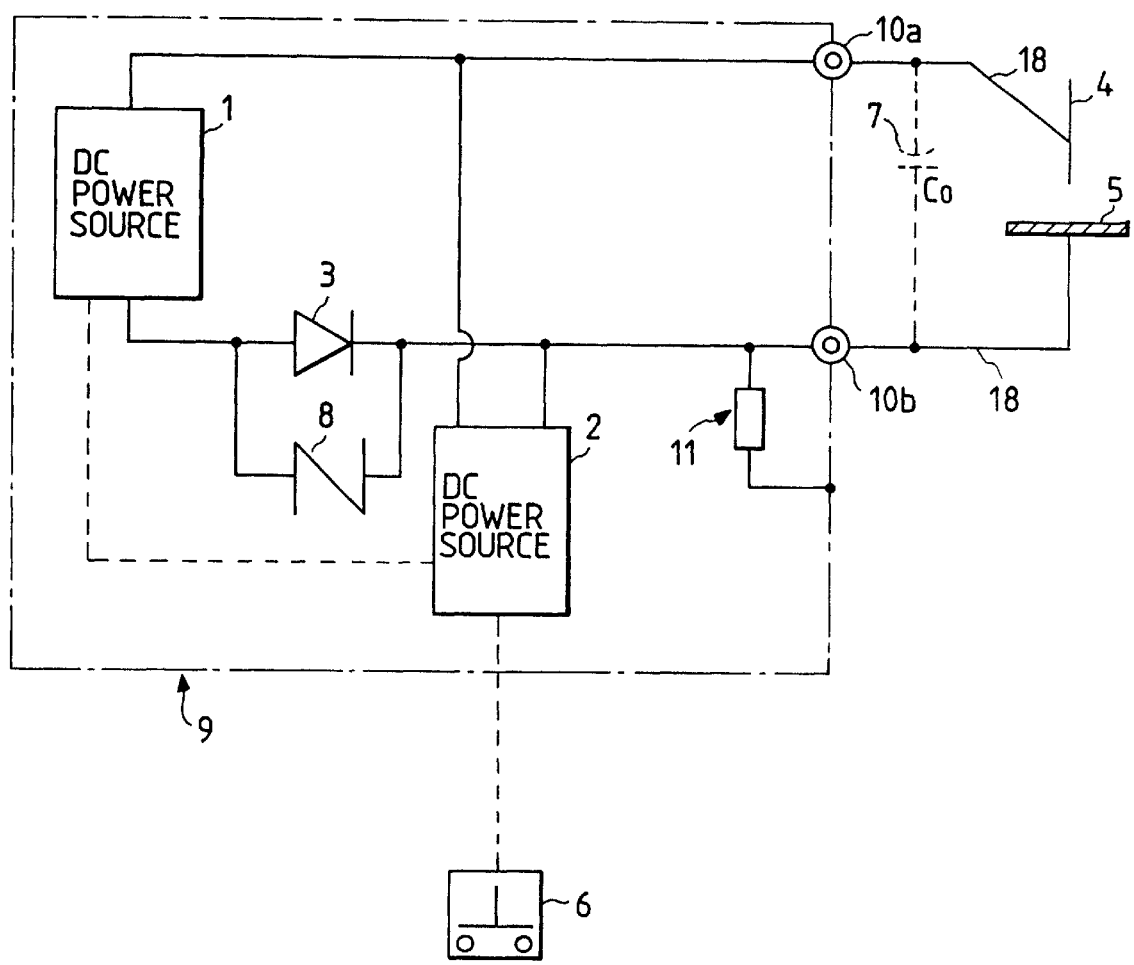
FIG. 10 is a block diagram which shows a dc high-voltage generator used in an arc welding or arc plasma cutting machine according to the present invention.

Referring now to the drawings, particularly to FIG. 10, there is shown an arc welding or arc plasma cutting machine having a dc high-voltage generator according to the present invention.

Figure 1:
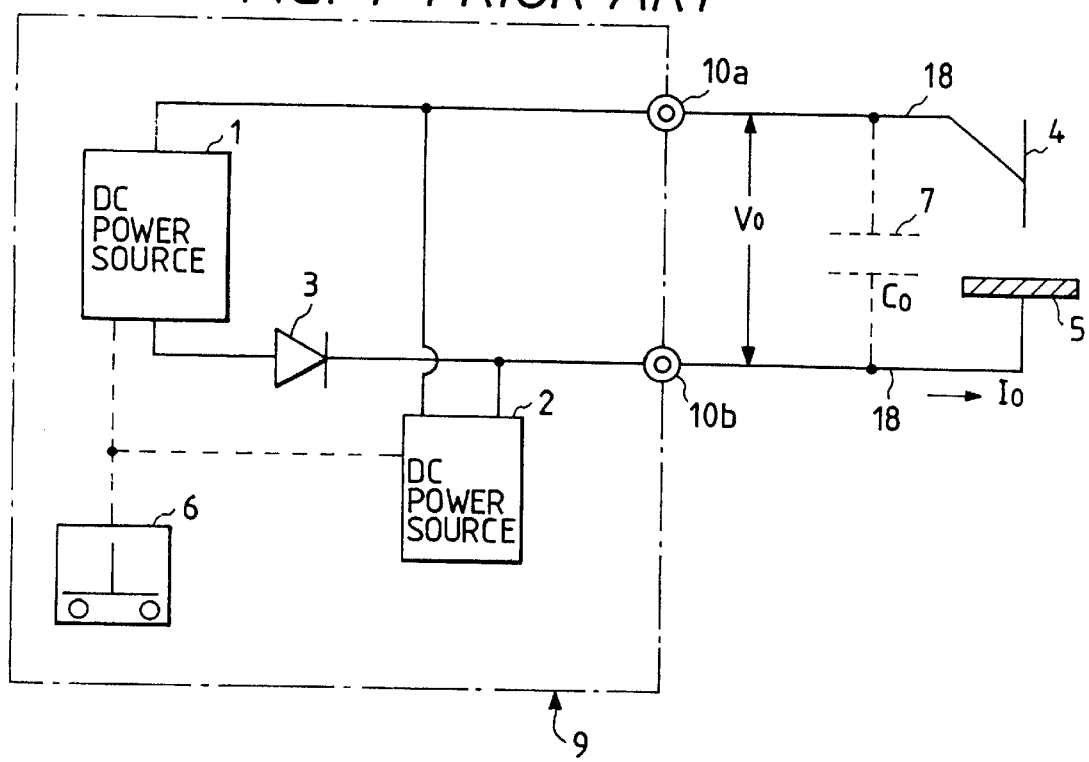
FIG. 1 is a block diagram which shows a conventional dc high-voltage generator used in an arc welding or arc plasma cutting machine.
Figure 2:
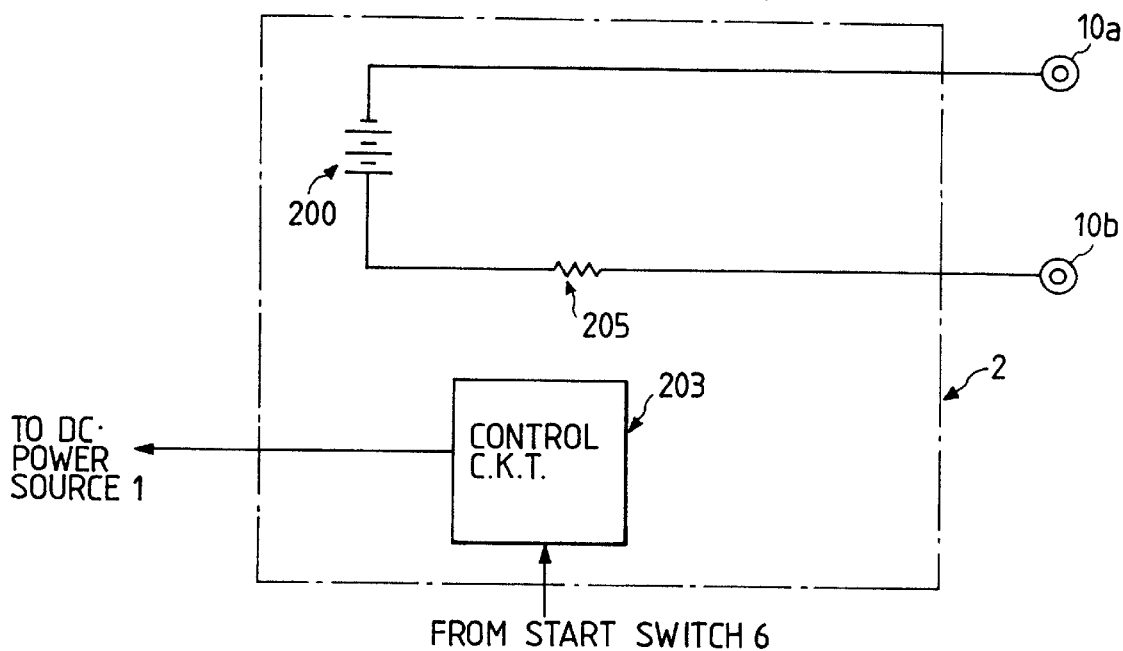
FIG. 2 is a block diagram which shows a circuit structure of a second dc power source of the dc high-voltage generator of FIG. 1.
Figure 3A:
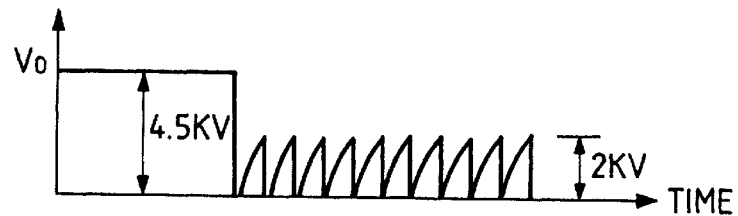
FIG. 3(a) is a time chart showing a variation in output voltage.
Figure 3B:
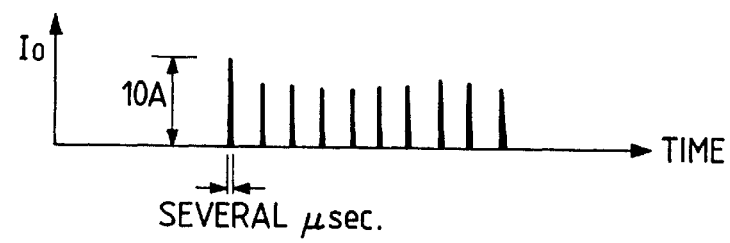
FIG. 3(b) is a time chart showing a variation in discharge current.
Figure 4:
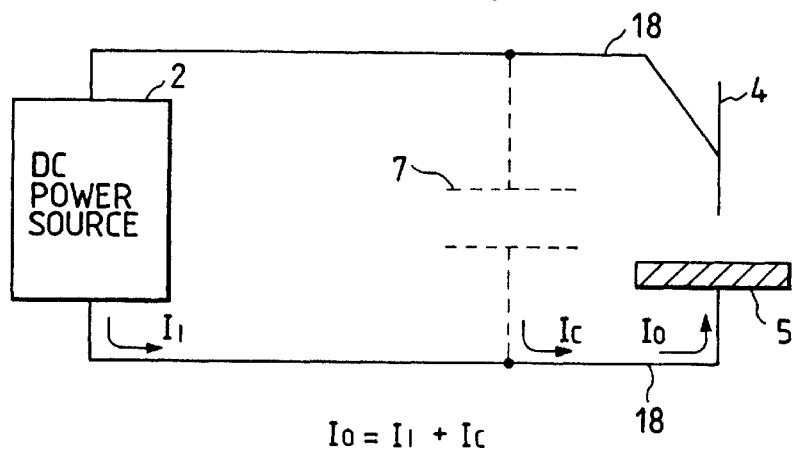
FIG. 4 is a block diagram which shows the discharge current flowing through a cable extension connected to a work piece.

The dc high-voltage generator includes a first dc power source 1, a second dc power source 2, a one-way rectifier 3, a start switch 6, a voltage clamping element 8, a charge protective circuit 11, output terminals 10a and 10b, and a casing 9. The first dc power source 1 and the second dc power source 2 have substantially the same circuit structures as the ones shown in FIG. 1, respectively. Specifically, the first dc power source 1 has a dropping characteristic or a quasi-constant voltage characteristic. The second dc power source has the dropping characteristic.

The output terminals 10a and 10b are connected to an electrode 4 and a work piece 5 through cable extensions 18 showing a distributed capacitance 7. The charge protective circuit 11 includes a resistor, an inductor, or a voltage clamping element and is connected between a line extending from the second dc power source 2 to the terminal 10 and an inner wall of the casing 9. The voltage clamping element 8 is disposed across the one-way rectifier 3.

In operation, turning on of the start switch 6 causes the first and second power sources 1 and 2 to be activated. The dc voltage produced by the second dc power source 2 is superimposed on the power produced by the first dc power source and then applied across the electrode 4 and the work piece 5 to develop an arc discharge therebetween.

The application of the dc voltage greater than a clamping voltage to the voltage clamping element 8 will cause the voltage clamping element 8 to be turned on to prevent the voltage higher than the clamping voltage from being applied to the one-way rectifier 3. This restricts the voltage appearing at the output terminals 10a and 10b below the clamping voltage.

Figure 11:
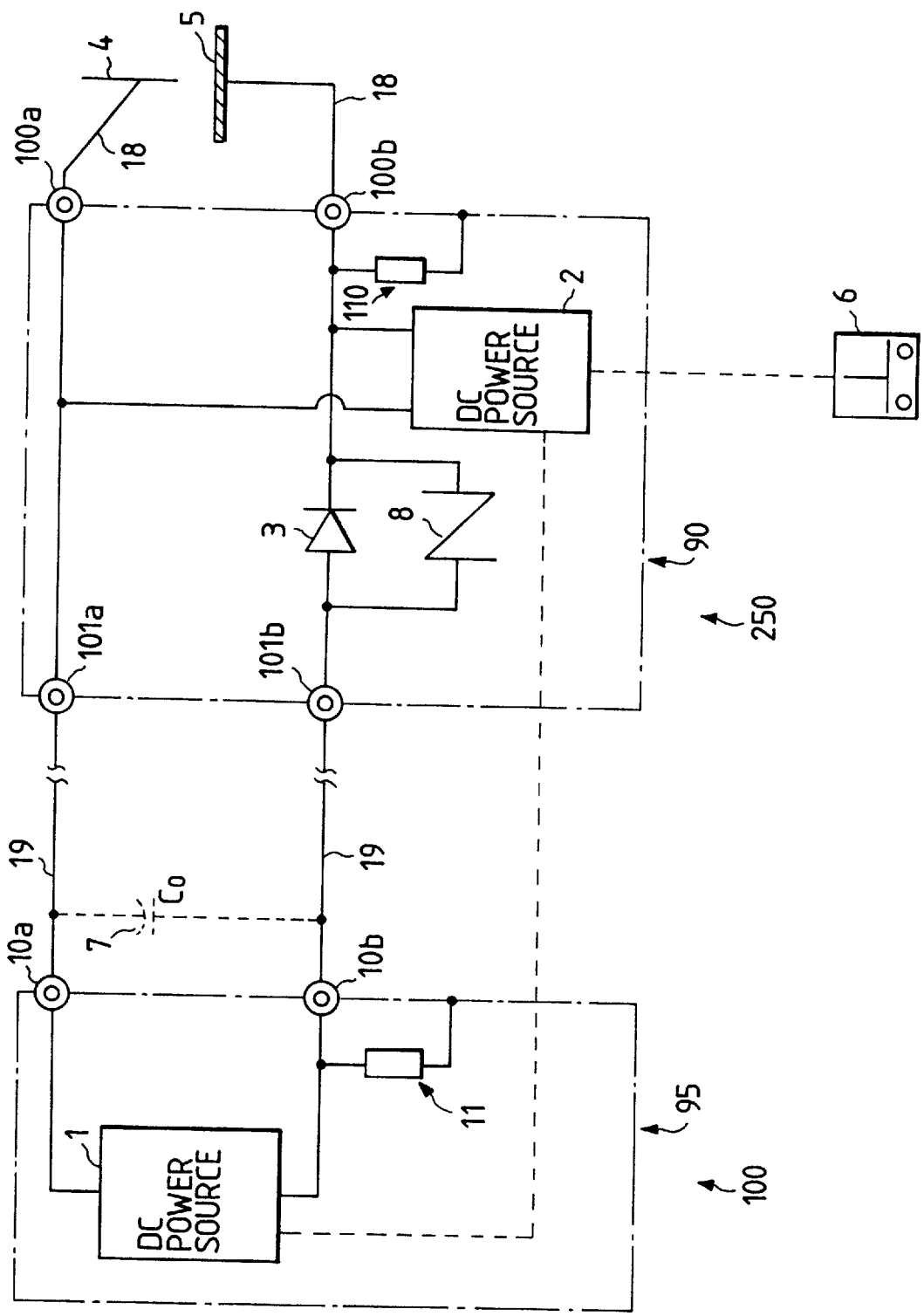
FIG. 11 is a block diagram which shows a dc high-voltage generator according to the second embodiment.

FIG. 11 shows the second embodiment of the dc high-voltage generator which includes first and second voltage generators 100 and 250. The same reference numbers as employed in the first embodiment refer to the same parts.

The first voltage generator 100 includes a first dc power source 1 and a charge protective circuit 11, and a casing 95. The second voltage generator 250 includes a one-way rectifier 3, a voltage clamping element 8, a second dc power source 2, a second charge protective circuit 110 having the same structure as that of the charge protective circuit 1 1, and a portable casing 90. An output terminals 10a and 10b of the first dc voltage power source 1 are connected through cable extensions 19 to input terminals 101a and 101b connected output terminals 100a and 100b provided in the casing 90. An electrode 4 is provided directly on the casing 90. Other arrangements are identical with those shown in FIG. 10, and explanation thereof in detail will be omitted here.

The one-way rectifier 3 serves to prevent a high-voltage output from the second dc power source 2 from being applied across cable extensions 18 so that the distributed capacitance 7 is not charged. Thus, even if an operator touches the electrode 4 in error, no discharge current flows to the operator from the distributed capacitance 7, thereby protecting the operator from electric shocks.

Figure 5:
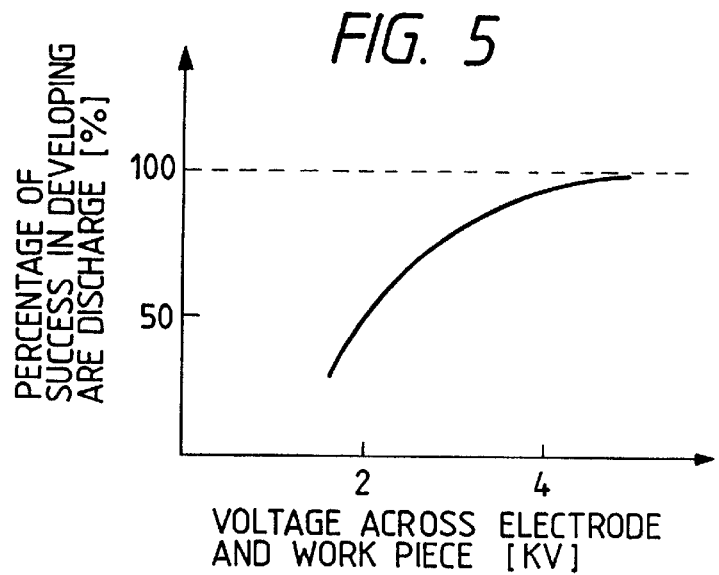
FIG. 5 is a graph which shows the relation between percentages of success in developing an arc discharge and the voltage appearing across an electrode and a work piece.
Figure 6:
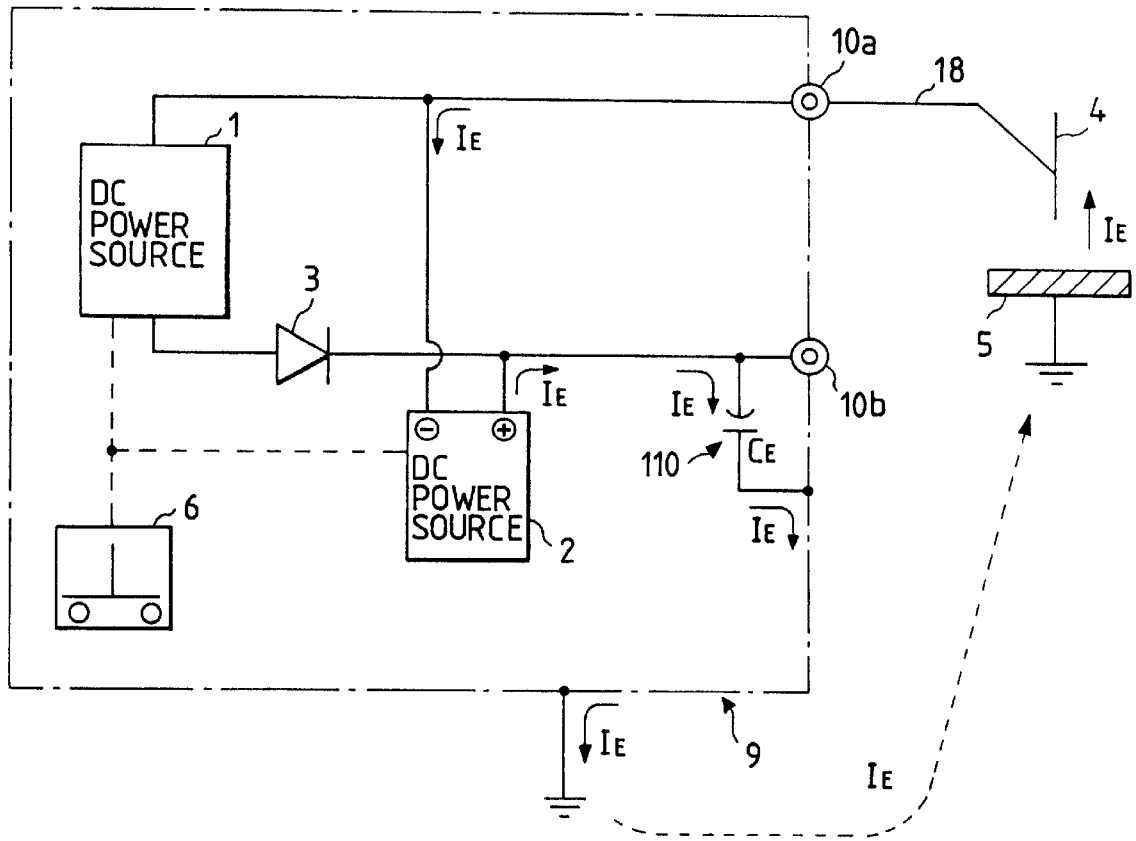
FIG. 6 is a block diagram which shows a circuit arrangement of a conventional dc high-voltage generator when a cable extension is not connected between a work piece and an output terminal.
Figure 7:
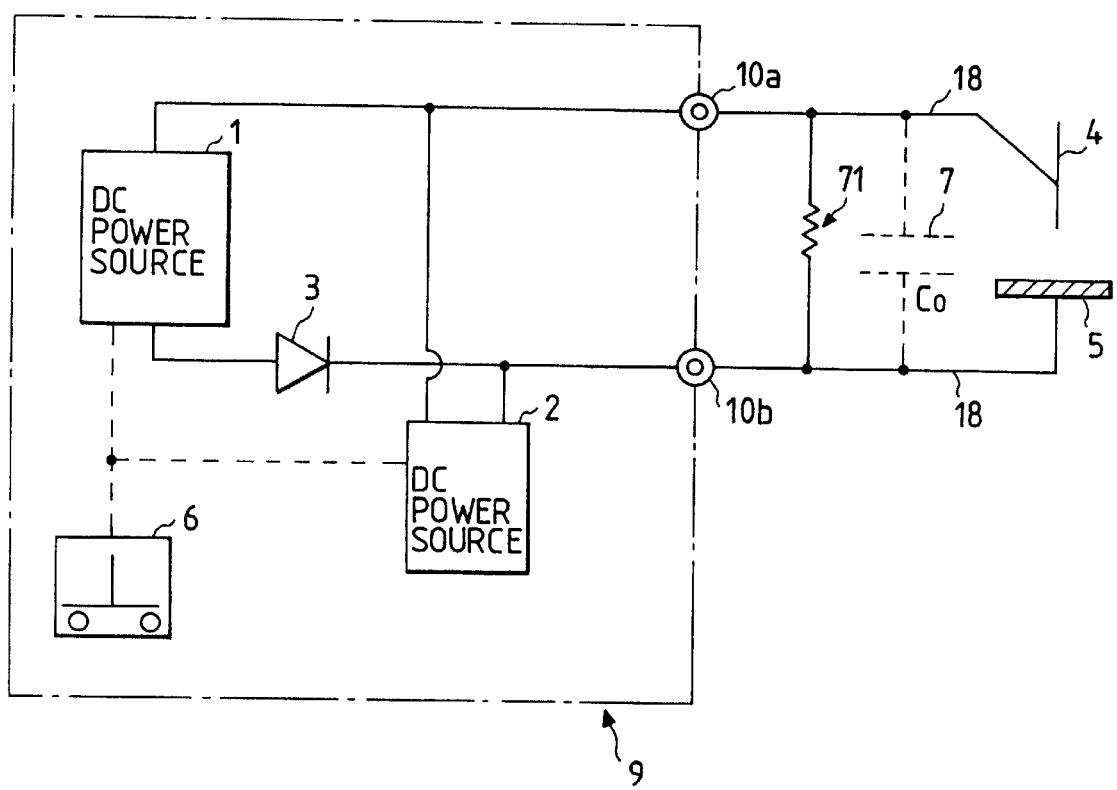
FIG. 7 is a block diagram which shows another conventional dc high-voltage generator used in an arc welding or arc plasma cutting machine.
Figure 8:
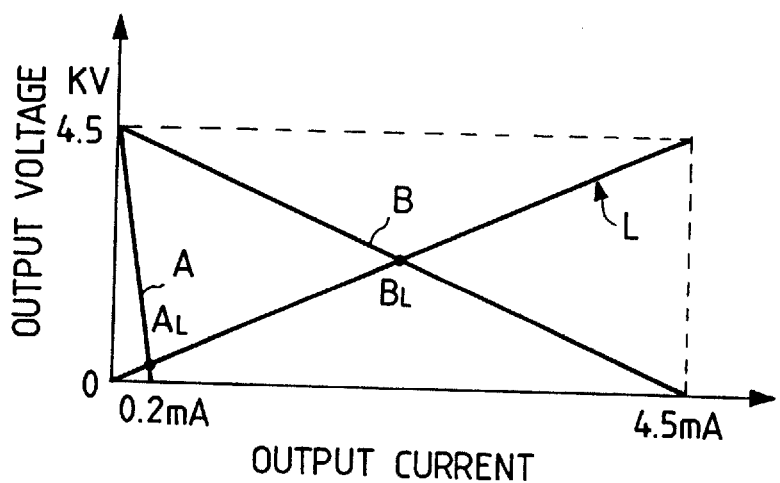
FIG. 8 is a graph which shows the relation between an output voltage and an output current.
Figure 9:
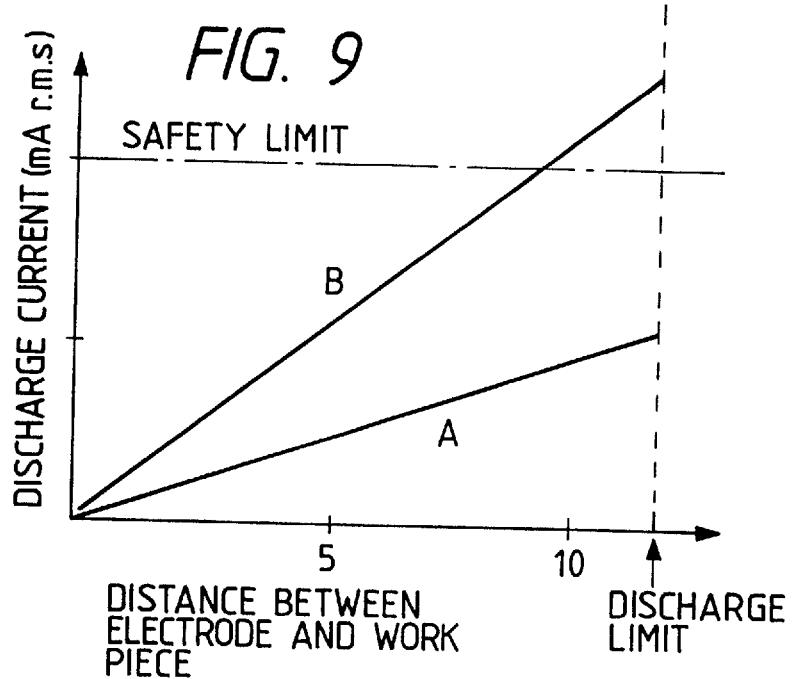
FIG. 9 is a graph which shows the relation between a discharge current and a distance between an electrode and a work piece.
Figure 12:
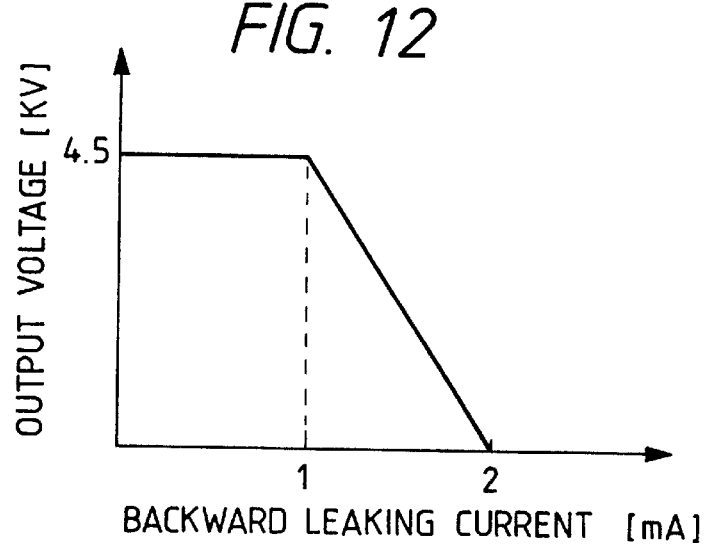
FIG. 12 is a graph which shows the relation between an output voltage and a backward leaking current flowing through a one-way rectifier.

FIG. 12 is a graph representing the relation between an output voltage of the dc high-voltage generator and the current leaking out of the rectifier 3 in the backward direction (hereinafter, referred to as a backward leaking current). The graph shows that when a maximum level of the backward leaking current is below 1 mA, an output voltage of about 4.5 kV is developed. FIG. 5 shows that when the voltage appearing across the electrode 4 and the work piece 5 is 4.5 kV, the percentage of success in developing an arc discharge will be about 100%. Specifically, a stable starting operation is achieved.

Figure 13:
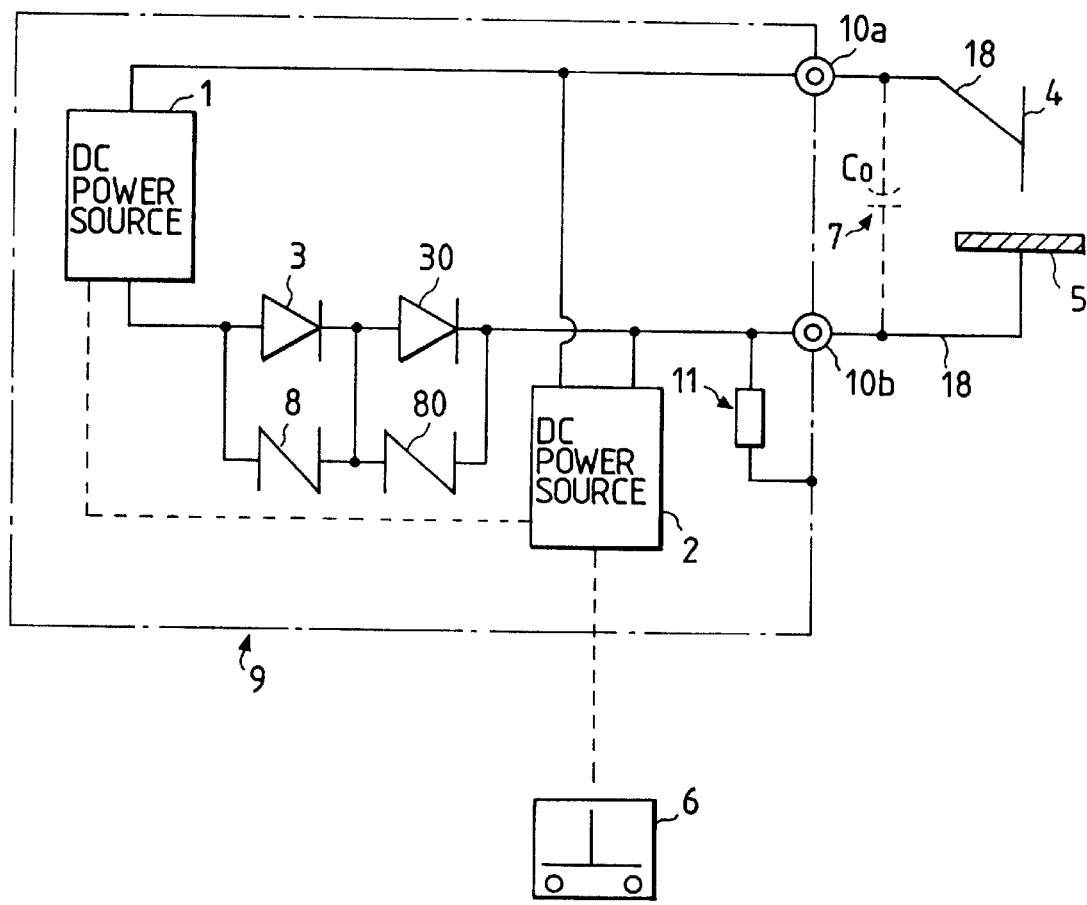
FIG. 13 is a block diagram which shows a dc high-voltage generator according to the third embodiment.

In FIG. 5, arc discharges are measured under following specifications:

1. output current is 50 A
2. the electrode 4 has a diameter of 2.4 mm and is made of tungsten containing thoria
3. Ar gas of five liters per minute are used
4. distance between the electrode 4 and the work piece 5 is 3 mm FIG. 13 shows the third embodiment of the dc high-voltage generator. The same reference numbers as employed in the above embodiments refer to the same parts.

The dc high-voltage generator of this embodiment has a second one-way rectifier 30 and a second voltage clamping element 80 which are arranged in parallel. The second one-way rectifier 30 is connected in series with the rectifier 3. The second voltage clamping element 80 is also connected in series with the voltage clamping element 8. A junction between the one-way rectifiers 3 and 30 is connected to a junction between the voltage clamping elements 8 and 80. These arrangements establish a withstand voltage withstanding a dc high-voltage applied to the one-way rectifiers 3 and 30. Three or more rectifiers and three or more voltage clamping elements may be used for further increasing the withstand voltage.

Figure 14:
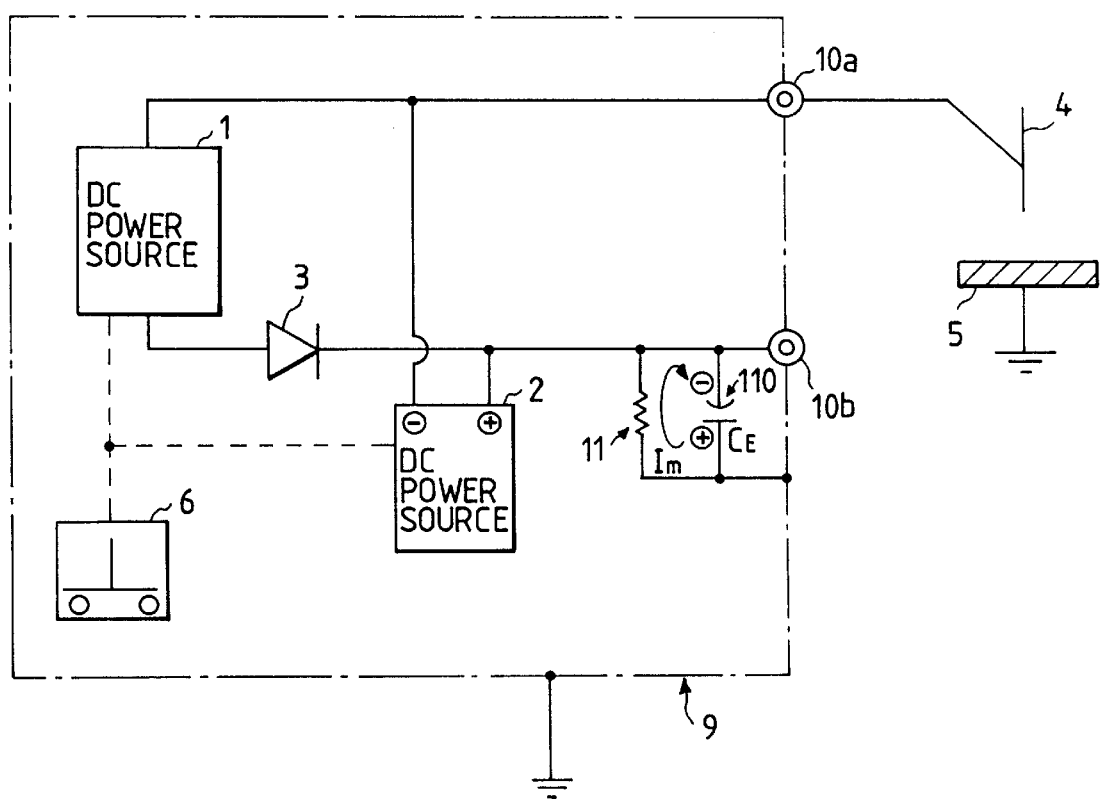
FIG. 14 is a block diagram which shows a dc high-voltage generator according to the fourth embodiment.

FIG. 14 shows the fourth embodiment of the dc high-voltage generator. The same reference numbers as employed in the above embodiments refer to the same parts.

The dc high-voltage generator of this embodiment has the surge protective capacitor 110 which is connected across the charge protective circuit 11. The work piece 5 is connected to the ground.

The polarities of a charge stored in the surge protective capacitor 110 when a cable extension is not connected between the work piece 5 and the output terminal 10b in the one shown in FIG. 5, are illustrated by "+" and "−" in FIG. 14. If the charge protective circuit 11 is not used, the charge stored in the surge protective capacitor 110 is eliminated only by self-discharge of the surge protective capacitor 110. Thus, if the operator touches the output terminal 10b standing on the ground, the operator may get an electric shock. In order to avoid this problem, this embodiment has the charge protective circuit 11 disposed across the surge protective capacitor 110 for discharging the charge stored in the surge protective capacitor 110 quickly as a result of flow of discharge current Im.

In FIG. 14, the charge protective circuit 11 is illustrated as a resistor, but this embodiment is not limited to the same. The charge protective circuit may Include a non-capacitive element other than the resistor.

Figure 15A:
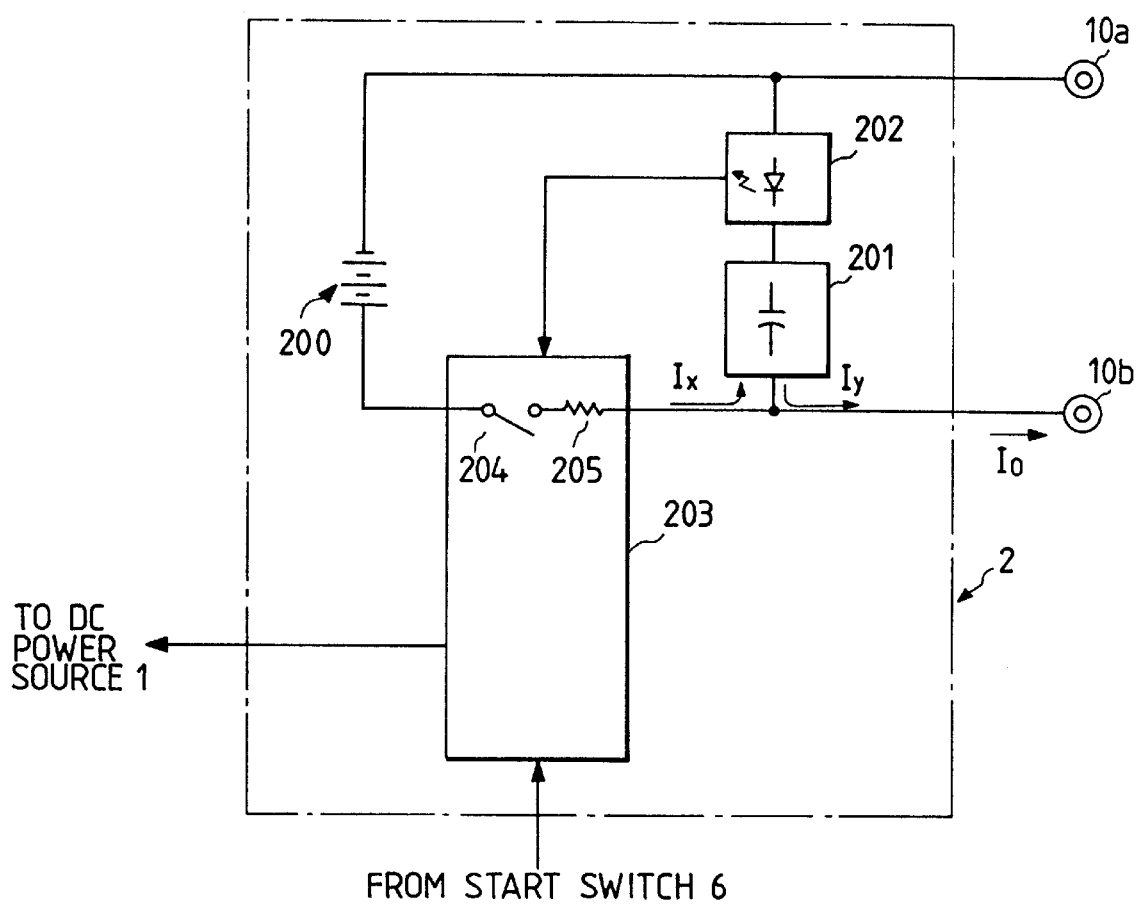
FIG. 15(a) is a block diagram which shows a circuit structure of a second dc power source according to the fifth embodiment.

FIG. 15(a) shows a circuit structure of the second dc power source 2 according to the fifth embodiment which may be used with the above embodiments.

The second dc power source 2 includes a voltage generator 200, a capacitive circuit 201, a discharge detector 202, and a control circuit 203 consisting of a switching element 204 and a dropping resistor 205.

Figures 16A, 16B, 16C, 16D:
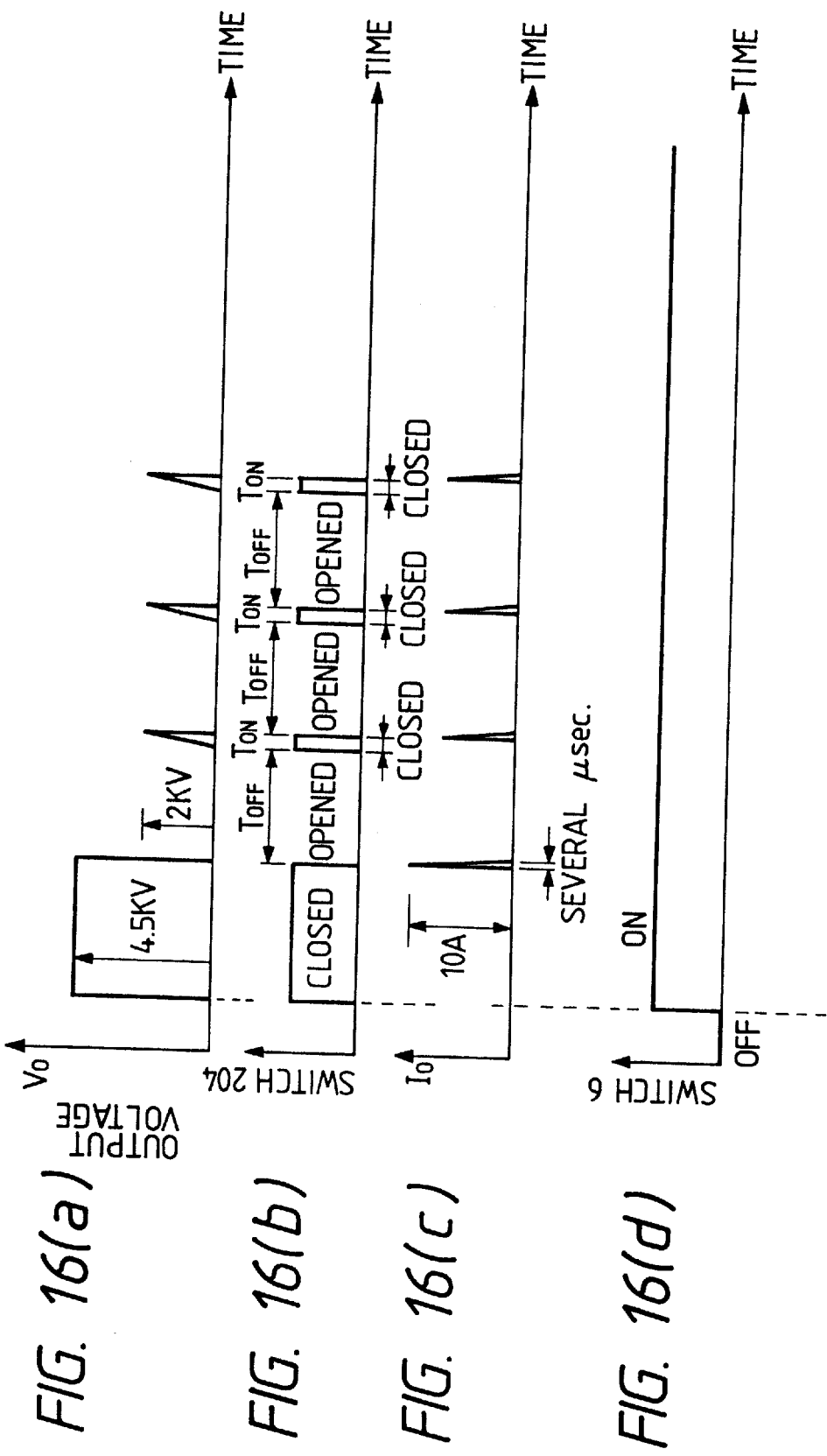
FIG. 16(a) is a time chart which shows an output voltage.
FIG. 16(b) is a time chart which shows operations of a switching element 204 in FIG. 15(a)
FIG. 16(c) is a time chart which shows a discharge current.
FIG. 16(d) is a time chart which shows an on-off operation of a start switch.

When no electric load is applied, the capacitive circuit 201 is charged only, and discharge current Iy does not flow through the capacitive circuit 201, thereby holding the switching element 204 closed as shown in FIG. 16(b). When an arc discharge is developed across the electrode 4 and the work piece 5 as shown in FIG. 16(a), it will cause the discharge current Iy to flow out of the capacitive circuit 201. The discharge detector 202 then detects the flow of the discharge current Iy to turn on the control circuit 203. The control circuit 203 then opens the switching element 204 for a given period of time TOFF as shown in FIG. 16(b), so that the voltage generator 200 provides no voltage output. After the given period of time TOFF expires, the switching element 204 is closed again for a given period of time TON, thereby causing the voltage generator 200 to apply the voltage across the electrode 4 and the work piece 5 for developing an arc discharge as shown in FIG. 16(a). This also causes the switching element 204 to be opened again to prohibit the voltage generator 200 from outputting the voltage. These repeated operations develop arc discharges cyclically.

Figure 15B:
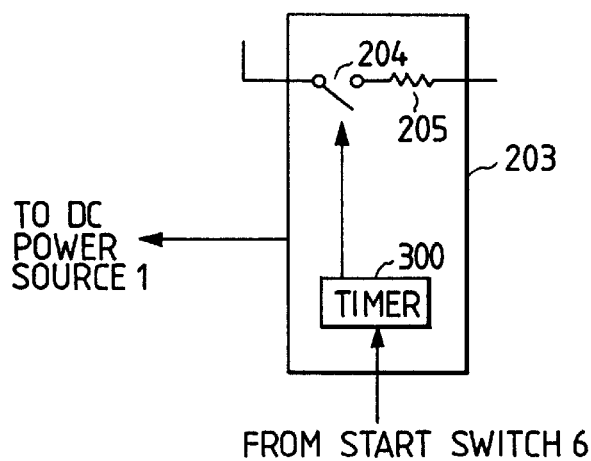
FIG. 15(b) is a circuit diagram which shows the sixth embodiment which is a modified form of the second dc power source 2 in FIG. 15(a)

FIG. 15(b) shows the sixth embodiment which is a modified form of the second dc power source 2 in FIG. 15(a).

The second dc power source of this embodiment is designed to deactivate both or either of the first and second dc power sources 1 and 2 if the first dc power source 1 fails to develop an arc discharge across the electrode 4 and the work piece 5 in a preselected period of time Th, which corresponds to several arc discharge cycles, following turning on of the start switch 6.

The control circuit 203 includes a timer 300 which counts up the preselected period of time Th in response to turning on of the start switch 6 and opens the switching element 204 after the preselected period of time Th expires. The control circuit 203 simultaneously provides an off-signal to deactivate the first dc power source 1.

The development of an arc discharge by the first dc power source 1 may be monitored by a current detector which is commonly used in typical arc welding and arc plasma cutting machines, and explanation thereof in detail will be omitted here.

Figure 17:
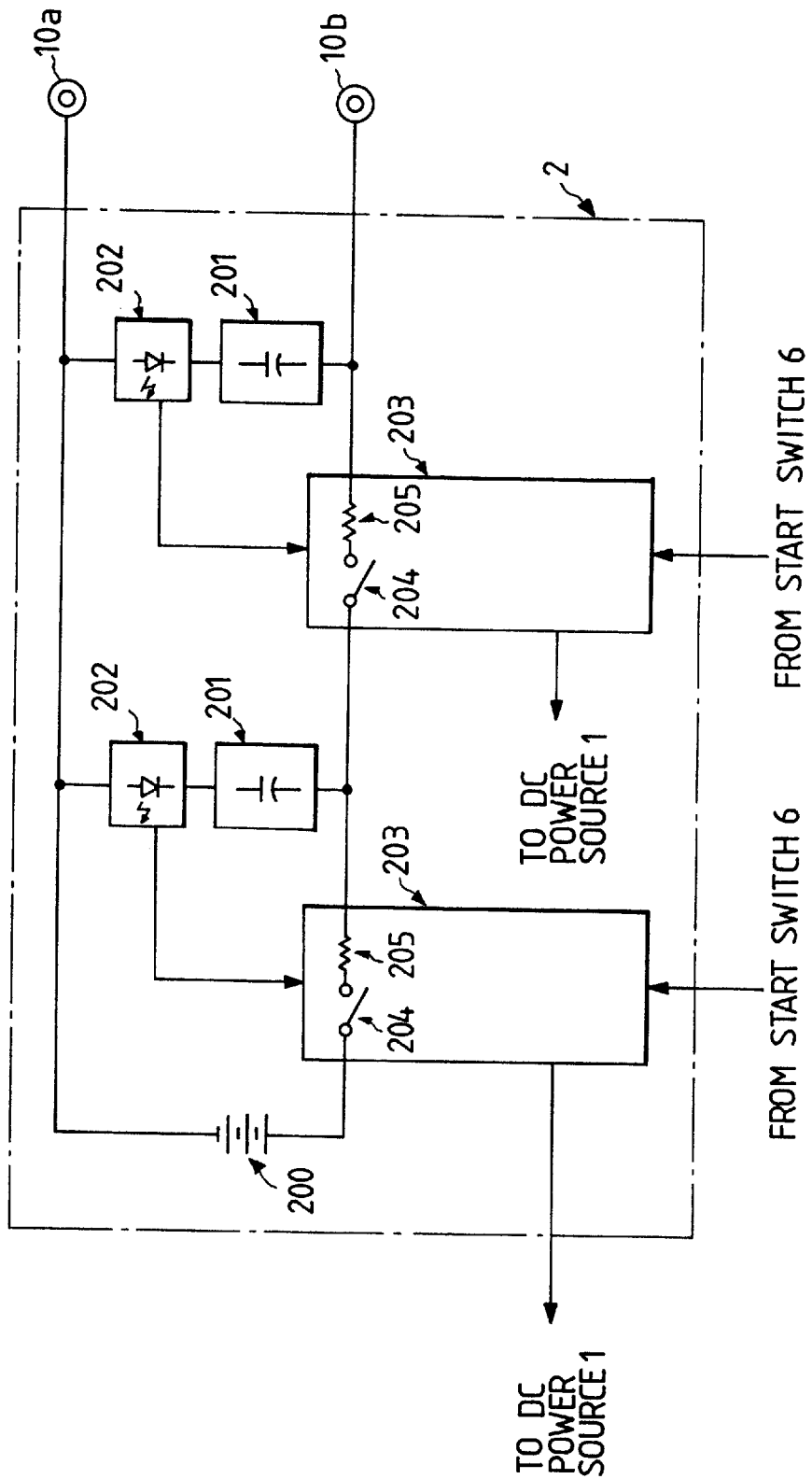
FIG. 17 is a block diagram which shows the seventh embodiment which is a modified form of the second dc power source 2 in FIG. 15(a)

FIG. 17 shows the seventh embodiment which is a modified form of the second dc power source 2 in FIG. 15(a).

The second dc power source 2 of this embodiment includes two capacitive circuits 201, two discharge detectors 202, and two control circuits 203 for compensating for malfunctions of either of the capacitive circuits 201, the discharge detectors 202, and the control circuits 203.

The capacitive circuits 201 and the discharge detectors 202 are arranged in parallel across the output terminals 10a and 10b. The control circuits 203 are arranged in series in a line extending to the output terminal 10b.

Figure 18:
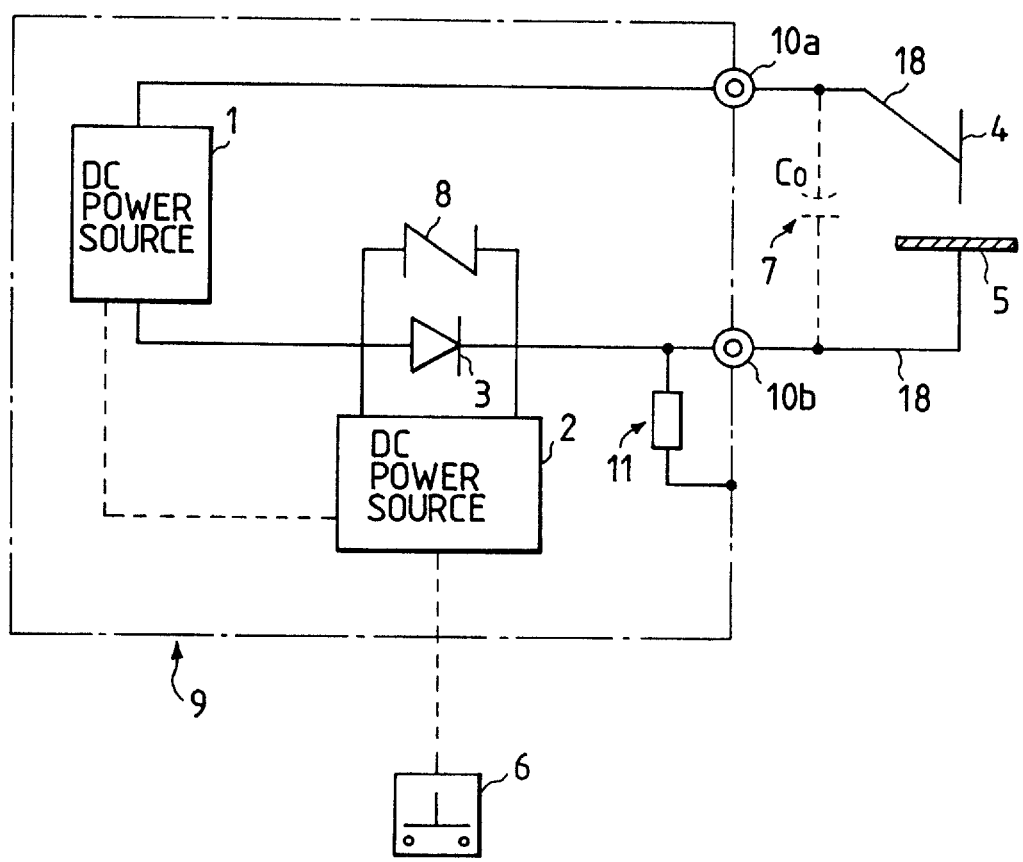
FIG. 18 is a block diagram which shows the eighth embodiment which is a modified form of the dc high-voltage generator in FIG. 10.

FIG. 18 shows the eighth embodiment which is a modified form of the dc high-voltage generator in FIG. 10.

The second dc power source 2 is disposed so as to apply an output voltage across the one-way rectifier 3 which is, in turn, applied across the output terminals 10a and 10b through the first dc power source 1. Since a voltage level and internal impedance of the first dc power source 1 are much smaller than those of the second dc power source 2, substantially the same effects as those of the above embodiments are achieved.

The shown circuit structure may be used with all the embodiments as discussed above.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An arc welding or arc plasma cutting machine comprising:

a pair of electrodes;

a first dc power source applying dc voltage across first and second output terminals connected to said electrodes;

a one-way rectifying circuit disposed between said first dc power source and the first output terminal;

a second dc power source connected across the first and second output terminals, said second dc power source superimposing dc voltage on power produced by said first dc power source for developing an arc discharge across said electrodes; and a voltage clamping circuit connected in parallel to said one-way rectifier.

2. An arc welding or arc plasma cutting machine as forth in claim 1, further comprising a first casing having disposed therein said first dc power source and a second casing having disposed therein said one-way rectifying circuit, said second dc power source, and said voltage clamping circuit which are connected to said first dc power source by electrical cable.

3. An arc welding or arc plasma cutting machine as set forth in claim 1, wherein said voltage clamping circuit is designed to restrict a maximum level of current leaking out of said one-way rectifying circuit in a backward direction when a backward bias voltage is applied across said one-way rectifying circuit below 1 mA.

4. An arc welding or arc plasma cutting machine as set forth in claim 1, wherein said one-way rectifing circuit includes a plurality of one-way rectifiers connected in series, said voltage clamping circuit including a plurality of voltage clamping elements connected in parallel to the one-way rectifiers, respectively.

5. An arc welding or arc plasma cutting machine as set forth in claim 1, further comprising a casing having disposed therein said first dc power source, said one-way rectifying circuit, said second dc power source, and said voltage clamping circuit and a charge protective circuit connected between the second output terminal and said casing.

6. An arc welding or arc plasma cutting machine as set forth in claim 5, wherein said charge protective circuit includes one of a resistor, an inductor, and a voltage clamping element.

7. An arc welding or arc plasma cutting machine as set forth in claim 1, wherein said second dc power source includes a voltage generator, a capacitive circuit, a discharge detector, and a control circuit, the capacitive circuit being charged and discharged according to a voltage level appearing across the first and second output terminals, the discharge detector detecting discharge of the capacitive circuit to provide a signal indicative thereof, the control circuit being responsive to the signal from the discharge detector to deactivate the voltage generator for a preselected period of time.

8. An arc welding or arc plasma cutting machine as set forth in claim 7, wherein the control circuit of said second dc power source includes a timer circuit which activates at least one of said first dc power source and the voltage generator of said second dc power source in response to input of a starting signal from a starting switch and which deactivates at least one of said first dc power source and the voltage generator of said second dc power source after a given period of time expires following the input of the starting signal to said control circuit if said first dc power source fails to develop an arc discharge across the electrodes in the given period of time.

9. An arc welding or arc plasma cutting machine as set forth in claim 1, wherein said second dc power source includes a voltage generator, a first circuit, and a second circuit, the first circuit including a capacitive circuit, a discharge detector, and a control circuit, the second circuit including a capacitive circuit, a discharge detector, and a control circuit, each of the capacitive circuits of the first and second circuits being charged and discharged according to a voltage level appearing across the first and second output terminals, each of the discharge detector detecting discharge of corresponding one of the capacitive circuit to provide a signal indicative thereof, each of the control circuit being responsive to the signal from corresponding one of the discharge detector to deactivate the voltage generator for a preselected period of time.

10. An arc welding or arc plasma cutting machine, comprising:

a pair of electrodes;
a dc high-voltage generator for applying a dc high-voltage across said electrodes, and including,
  (i) a first dc power source for applying a dc voltage across first and second output terminals connected to said electrodes,
  (ii) a one-way rectifying circuit disposed between said first dc power source and the first output terminal,
  (iii) a second dc power source connected across the first and second output terminals, said second dc power source superimposing a dc voltage on power produced by said first dc power source for developing an arc discharge across said electrodes; and
a voltage clamping circuit connected in parallel to said one-way rectifier.

11. An arc welding or arc plasma cutting machine as set forth in claim 10, further comprising a first casing having disposed therein said first dc power source and a second casing having disposed therein said one-way rectifying circuit, said second dc power source, and said voltage clamping circuit which are connected to said first dc power source by electrical cable.

12. An arc welding or arc plasma cutting machine as set forth in claim 10, wherein said voltage clamping circuit is designed to restrict a maximum level of current leaking out of said one-way rectifying circuit in a backward direction when a backward bias voltage is applied across said one-way rectifying circuit below 1 mA.

13. An arc welding or arc plasma cutting machine as set forth in claim 10, wherein said one-way rectifying circuit includes a plurality of one-way rectifiers connected in series, said voltage clamping circuit including a plurality of voltage clamping elements connected in parallel to the one-way rectifiers, respectively.

14. An arc welding or arc plasma cutting machine as set forth in claim 10, further comprising a casing having disposed therein said first dc power source, said one-way rectifying circuit, said second dc power source, and said voltage clamping circuit and a charge protective circuit connected between the second output terminal and said casing.

15. An arc welding or arc plasma cutting machine as set forth in claim 14, wherein said charge protective circuit includes one of a resistor, an inductor, and a voltage clamping element.

16. An arc welding or arc plasma cutting machine as set forth in claim 10, wherein said second dc power source includes a voltage generator, a capacitive circuit, a discharge detector, and a control circuit, the capacitive circuit being charged and discharged according to a voltage level appearing across the first and second output terminals, the discharge detector detecting discharge of the capacitive circuit to provide a signal indicative thereof, and the control circuit being responsive to the signal from the discharge detector to deactivate the voltage generator for a preselected period of time.

17. An arc welding or arc plasma cutting machine as set forth in claim 16, wherein the control circuit of said second dc power source includes a timer circuit which activates at least one of said first dc power source and the voltage generator of said second dc power source in response to input of a starting signal from a starting switch and which deactivates at least one of said first dc power source and the voltage generator of said second dc power source after a given period of time expires following the input of the starting signal to said control circuit if said first dc power source fails to develop an arc discharge across the electrodes in the given period of time.

18. An arc welding or arc plasma cutting machine as set forth in claim 10, wherein said second dc power source includes a voltage generator, a first circuit, and a second circuit, the first circuit including a capacitive circuit, a discharge detector, and a control circuit, the second circuit including a capacitive circuit, a discharge detector, and a control circuit, each of the capacitive circuits of the first and second circuits being charged and discharged according to a voltage level appearing across the first and second output terminals, each of the discharge detectors detecting discharge of corresponding one of the capacitive circuits to provide a signal indicative thereof, each of the control circuits being responsive to the signal from a corresponding one of the discharge detectors to deactivate the voltage generator for a preselected period of time.

\* \* \* \* \*